(12) United States Patent
Cashman et al.

(10) Patent No.: US 7,443,788 B2
(45) Date of Patent: Oct. 28, 2008

(54) METHOD AND APPARATUS FOR IMPROVING PERFORMANCE OF A LOOP NETWORK

(75) Inventors: Paul Nicholas Cashman, Alton (GB); Robert Frank Maddock, Christchurch (GB); Robert Bruce Nicholson, Portsmouth (GB); Michael Alan Veal, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 1152 days.

(21) Appl. No.: 10/213,343

(22) Filed: Aug. 6, 2002

(65) Prior Publication Data

US 2003/0031163 A1   Feb. 13, 2003

(30) Foreign Application Priority Data

Aug. 6, 2001   (GB) .................................. 0119069.3

(51) Int. Cl.
*G06F 11/00* (2006.01)
*H04J 1/16* (2006.01)

(52) U.S. Cl. ....................... 370/222; 370/221; 370/223; 370/224; 370/225; 370/217; 370/254; 370/403; 370/405

(58) Field of Classification Search ......... 370/216–220, 370/221, 222, 223–228, 254, 403, 405, 453; 709/203; 714/6, 43, 4
See application file for complete search history.

(56) References Cited

U.S. PATENT DOCUMENTS

| | | | |
|---|---|---|---|
| 5,812,754 A | 9/1998 | Lui et al. ................ | 395/182.04 |
| 5,898,828 A | 4/1999 | Pignolet et al. ........ | 395/182.04 |
| 6,504,817 B2 * | 1/2003 | Oldfield et al. ............. | 370/217 |
| 6,546,498 B1 * | 4/2003 | Saegusa ......................... | 714/4 |
| 6,578,158 B1 * | 6/2003 | Deitz et al. .................... | 714/11 |
| 6,678,839 B2 * | 1/2004 | Mori ........................... | 714/44 |
| 7,269,131 B2 * | 9/2007 | Cashman et al. ............. | 370/217 |
| 2002/0174197 A1 * | 11/2002 | Schimke et al. ............. | 709/220 |

OTHER PUBLICATIONS

Examination Report under Section 18(3).
Examination Report under Section 18(3) 1977.

* cited by examiner

*Primary Examiner*—Edan Orgad
*Assistant Examiner*—Ho Chuong
(74) *Attorney, Agent, or Firm*—Kunzler & McKenzie (57) ABSTRACT

A method and apparatus for improving performance of a loop network, in particular a Fiber Channel Arbitrated Loop. The loop network has two loops and a plurality of dual-ported devices each with one port on each loop. The method includes selectively bypassing redundant ports on the loops by a first command means in the form of a Fiber Channel Arbitrated Loop command to balance port accesses and to reduce the loop overhead by reducing the number of ports in each loop. In the event of a fault, bypassing the port of a device by a second command means in the form of a non Fiber Channel Arbitrated Loop command and enabling all the bypassed redundant ports with a single command to all ports using the first command means. The first command means does not enable the port bypassed by the second command means.

10 Claims, 5 Drawing Sheets

METHOD AND APPARATUS FOR IMPROVING PERFORMANCE OF A LOOP NETWORK

FIELD OF INVENTION

This invention relates to a method and apparatus for improving performance of a loop network. In particular, the invention relates to improving performance of Fibre Channel Arbitrated Loops. The invention could equally apply to other unidirectional loops, for example, Token Ring networks, FDDI (Fibre Data Distributed Interfaces), etc

BACKGROUND OF THE INVENTION

Fibre Channel Arbitrated Loop (FC-AL) architecture is a member of the Fibre Channel family of ANSI standard protocols. FC-AL is typically used for connecting together computer peripherals, in particular disk drives. The FC-AL architecture is described in NCITS working draft proposal, American National Standard for Information Technology "Fibre Channel Arbitrated Loop (FC-AL-2) Revision 7.0", Apr. 1, 1999.

Electronic data systems can be interconnected using network communication systems. Area-wide networks and channels are two technologies that have been developed for computer network architectures. Area-wide networks (e.g. LANs and WANs) offer flexibility and relatively large distance capabilities. Channels, such as the Small Computer System Interface (SCSI), have been developed for high performance and reliability. Channels typically use dedicated short-distance connections between computers or between computers and peripherals.

Fibre Channel technology has been developed for optical point-to-point communication of two systems or a system and a subsystem. It has evolved to include electronic (non-optical) implementations and has the ability to connect many devices, including disk drives, in a relatively low-cost manner. This addition to the Fibre Channel specifications is called Fibre Channel Arbitrated Loop (FC-AL).

Fibre Channel technology consists of an integrated set of standards that defines new protocols for flexible information transfer using several interconnection topologies. Fibre Channel technology can be used to connect large amounts of disk storage to a server or cluster of servers. Compared to Small Computer Systems Interface (SCSI), Fibre Channel technology supports greater performance, scalability, availability, and distance for attaching storage systems to network servers.

Fibre Channel Arbitrated Loop (FC-AL) is a loop architecture as opposed to a bus architecture like SCSI. FC-AL is a serial interface, where data and control signals pass along a single path rather than moving in parallel across multiple conductors as is the case with SCSI. Serial interfaces have many advantages including: increased reliability due to point-to-point use in communications; dual-porting capability, so data can be transferred over two independent data paths, enhancing speed and reliability; and simplified cabling and increased connectivity which are important in multi-drive environments. As a direct disk attachment interface, FC-AL has greatly enhanced I/O performance.

Devices are connected to a FC-AL using hardware which is termed a "port". A device which has connections for two loops has two ports or is "dual-ported".

The operation of FC-AL involves a number of ports connected such that each port's transmitter is connected to the next port's receiver, and so on, forming a loop. Each port's receiver has an elasticity buffer that captures the incoming FC-AL frame or words and is then used to regenerate the FC-AL word as it is re-transmitted. This buffer exists to deal with slight clocking variations that occur. Each port receives a word, and then transmits that word to the next port, unless the port itself is the destination of that word, in which case it is consumed. The nature of FC-AL is therefore such that each intermediate port between the originating port and the destination port gets to 'see' each word as it passes around the FC-AL loop.

FC-AL architecture may be in the form of a single loop. Often two independent loops are used to connect the same devices in the form of dual loops. The aim of these loops is to provide an alternative path to devices on a loop should one loop fail. A single fault should not cause both loops to fail simultaneously. More than two loops can also be used.

FC-AL devices typically have two ports allowing them to be attached to two FC-ALs. Thus, in a typical configuration, two independent loops exist and each device is physically connected to both loops. When the system is working optimally, there are two possible loops that can be used to access any dual-ported device.

A FC-AL can incorporate bypass circuits with the aim of making the FC-AL interface sufficiently robust to permit devices to be removed from the loop without interrupting throughput and sacrificing data integrity. If a disk drive fails, port bypass circuits attempt to route around the problem so all disk drives on the loop remain accessible. Without port bypass circuits a fault in any device will break the loop.

In dual loops, port bypass circuits are provided for each loop and these provide additional protection against faults. A port can be bypassed on one loop while remaining active on the dual loop.

A typical FC-AL may have one or two host bus adapters (HBA) and a set of six or so disk drive enclosures or drawers, each of which may contain a set of ten to sixteen disk drives. There is a physical cable connection between each enclosure and the HBA in the FC-AL. Also, there is a connection internal to the enclosure or drawer, between the cable connector and each disk drive in the enclosure or drawer, as well as other components within the enclosure or drawer, e.g. SES device (SCSI Enclosure Services node) or other enclosure services devices.

A SES device is an example of an enclosure service device which manages a disk enclosure and allows the monitoring of power and cooling in an enclosure. The SES device also obtains information as to which slots in an enclosure are occupied. The SES device accepts a limited set of SCSI commands. SCSI Enclosure Services are described in the working draft proposed by the American National Standards for Information Systems "SCSI-3 Enclosure Services Command Set (SES), Revision 8a", Jan. 16, 1997.

SES devices may be dedicated SES nodes on the loop or alternatively there may be a disk drive that also supports the SES command set. For the purposes of this disclosure, either type of device will be referred to as an SES device.

EP-A-0 869 641 in the name of Hewlett-Packard Company teaches a Fibre Channel Arbitrated Loop including dynamic loop sizing by selectively bypassing operational device ports in the loop in order to minimise overhead associated with loop size. In redundant systems with multiple loops, the system is optimised by distribution of bypassed ports among the loops. By bypassing unused or unneeded ports off a loop, the round trip delay of the loop is appreciably shortened as each port contributes a delay to the transmission of a signal around a loop. By minimising the round trip delay, arbitration overhead and access latency is reduced and loop bandwidth and overall performance is improved. EP-A-0 869 641 also teaches dynamic load sharing which balances the load between the dual loops when using dual-ported devices on the loops. This is accomplished by bypassing a given subset of devices off each loop to reduce round trip delay, monitoring traffic on the loops and controlling which devices are attached to which loop in order to balance the load across the loops.

In some arrangements, a dual loop network with both loops operational with I/O to both ports of dual-ported devices is acceptable. However, the overheads in loops in which both dual ports are accessed can cause operational delays. Therefore, one port of each dual-ported device may be considered as redundant in order to limit the loop delays due to port overheads.

When selectively bypassing ports for performance enhancement, for example as disclosed in EP-A-0 869 641, there is a risk that performance bypassing and fault bypassing will conflict and interact with each other. This is particularly true in an environment in which there is more than one host bus adapter or other form of initiator. The performance bypassing may also interact with an initialisation procedure of a loop resulting in longer recovery periods and I/O delay.

DISCLOSURE OF THE INVENTION

The aim of the present invention is to improve performance of loop networks by bypassing redundant ports and also maintaining and managing the bypassing of faulty ports.

According to a first aspect of the present invention there is provided a method for improving performance of a loop network, the loop network having a first loop, a second loop and a plurality of dual-ported devices each with one port on each loop, the method including: selectively bypassing redundant ports on the loops by a first command means; in the event of a fault, bypassing the port of a device by a second command means; and enabling all the bypassed redundant ports with a single command to all ports using the first command means; wherein the first command means does not enable the port bypassed by the second command means.

The method may include selectively bypassing redundant ports to balance the port accesses across the loops.

The loop network is preferably a Fibre Channel Arbitrated Loop (FC-AL) and the first command means is a Fibre Channel Arbitrated Loop command. The second command means may be an enclosure services device command.

Enabling all the bypassed redundant ports may be carried out by a Loop Port Enable All (LPEall) Fibre Channel Arbitrated Loop command.

The method may further include initialising each loop of the network and again selectively bypassing redundant ports in the loop network.

There may be more than two loops in the loop network.

According to a second aspect of the present invention there is provided a loop network having a first loop, a second loop and a plurality of dual-ported devices each with one port on each loop, the method including: means for selectively bypassing redundant ports on the loops by a first command means; in the event of a fault, means for bypassing the port of a device by a second command means; and means for enabling all the bypassed redundant ports with a single command to all ports using the first command means; wherein the first command means does not enable the port bypassed by the second command means.

The loop network is preferably a Fibre Channel Arbitrated Loop (FC-AL) and the first command means is a Fibre Channel Arbitrated Loop command. Enabling all the bypassed redundant ports may be carried out by a Loop Port Enable All (LPEall) Fibre Channel Arbitrated Loop command.

The loop network may have at least one enclosure with an enclosure services device and the second command means may be the enclosure services device.

The loop network may include more than one host bus adapter and the means for selectively bypassing redundant ports provides a consistent view of the remaining operational ports to all the host bus adapters. There may be more than two loops in the loop network.

According to a third aspect of the present invention there is provided a computer program product stored on a computer readable storage medium comprising computer readable program code means for improving performance in a loop network, the loop network having a first loop, a second loop and a plurality of dual-ported devices each with one port on each loop, the program code means performing the steps of: selectively bypassing redundant ports on the loops by a first command means; in the event of a fault, bypassing the port of a device by a second command means; and enabling all the bypassed redundant ports with a single command to all ports using the first command means; wherein the first command means does not enable the port bypassed by the second command means.

BRIEF DESCRIPTION OF THE DRAWINGS

Embodiments of the invention are now described, by means of examples only, with reference to the accompanying drawings in which.

DESCRIPTION OF THE PREFERRED EMBODIMENTS

A loop network system with a plurality of serially connected ports in the form of a Fibre Channel Arbitrated Loop (FC-AL) is described for connecting together computer peripherals, in particular disk drives. The described embodiments are given in the context of FC-AL architecture although the described method and apparatus could be applied to any unidirectional loop network.

Figure 1:
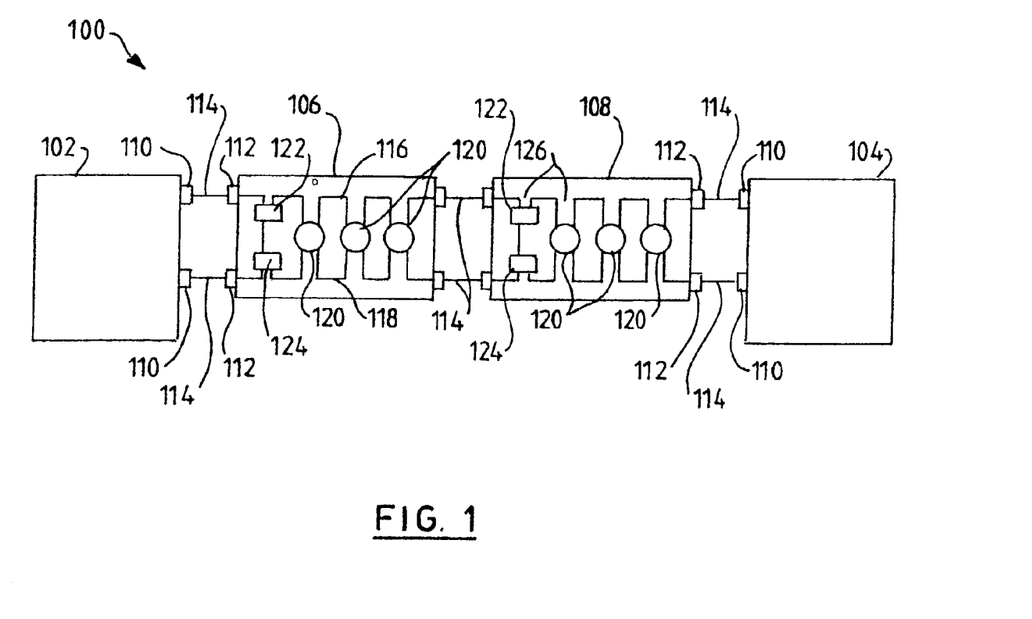
FIG. 1 is a diagram of a dual loop network in which the teaching of the present invention may be practiced.

Referring to FIG. 1, an exemplary loop network 100 is shown in the form of a Fibre Channel Arbitrated Loop with two host bus adapters 102, 104. FIG. 1 shows one form of a loop network on which the present invention may be practiced.

The loop network 100 in the shown embodiment has two enclosures 106, 108. Each enclosure in this embodiment has three disk drives 120 although in practice there are usually 10 or more disk drives in an enclosure. Dual loops 116, 118 each connect the components in the loop network 100. A first loop 116 is shown along the top of the loop network 100 in the diagram and a second loop 118 is shown along the bottom of the loop network 100 in the diagram.

The adapters 102, 104 have external connectors 110 for cables 114 connecting each loop 116, 118 from the adapters 102, 104 to external connectors 112 of the enclosures 106, 108. Cables 114 also connect the two enclosures 106, 108 such that each loop 116, 118 passes from one enclosure 106 to the next enclosure 108.

Each loop 116, 118 passes from the first adapter 102 via an adapter external connector 110, a cable 114 and an enclosure external connector 112 to the first enclosure 106. In the first enclosure 106 of the exemplary loop network 100, each loop 116, 118 passes through its own SES (SCSI Enclosure Services) device or controller 122, 124 and then through each of the disk drives 120 in turn. The two loops 116, 118 both pass through the same shared disk drives 120. Each loop 116, 118 then leaves the first enclosure via an enclosure external connector 112 and passes through a cable 114 to a second enclosure 108 which it enters via an enclosure external connector 112. The second enclosure 108 has the same set of components as the first enclosure 106. Each loop 116, 118, after passing through the second enclosure 108 is connected to the second adapter 104 via enclosure external connectors 112, cables 114 and adapter external connectors 110.

In each enclosure 106, 108, a loop 116 enters from an external connector 112 and is routed through each of the disk drives 120 and an SES device 122, 124. All devices in the loop 100, including host bus adapters 102, 104, disk drives 120 and any enclosure controllers 122, 124 have hardware connections to a loop 106, 108 referred to as ports. Each port has a receiver and a transmitter. The ports are connected such that each port's transmitter is connected to the next port's receiver, and so on, forming the loop 106, 108. Each port's receiver has an elasticity buffer that captures the incoming FC-AL frame and is then used to regenerate the FC-AL frame as it is re-transmitted.

Each port of a disk drive 120 or SES device 122, 126 has a bypass circuit to enable it to be bypassed from each loop, if required. The disk drives 120 are examples of dual port devices in that they are common to both the loops 116, 118 of the loop network 100.

An SES device 122, 124 is provided on each loop 116, 118 in each enclosure and the two SES devices 122, 124 are connected together through the enclosure's backplane. One SES device can be used to control the other SES device. An SES device manages an enclosure and provides a point of control for each enclosure. It can monitor parameters such as power and cooling and obtain information as to which slots for disk drives are occupied. It accepts a limited set of SCSI commands. SES devices can be used to instruct a bypass of a disk drive and to check which disk drives are bypassed.

The SES devices 122, 124 shown in FIG. 1 are provided as nodes in the loops 116, 118. These are referred to as "in loop" SES devices.

SES devices can also be provided by means of an Enclosure Services Interface (ESI) in which case the SES devices are not in the loop but are interfaced from one or more disk drives. SES devices of this nature are usually provided on a few disk drives in each enclosure. Commands can be sent to the SES device in an enclosure via the disk drive with the ESI.

One feature of the SES devices is to control the port bypass circuits for the ports of disk drives housed within the enclosure. The SES command set provides an Enclosure Control Page which allows the setting of the bypass circuits to be specified. The SES device therefore allows the host bus adapter to use the standard SES interface to bypass the ports of individual disk drives in a loop as required. The same interface can be used to un-bypass or enable the ports.

Bypassing of ports can also be carried out by the device itself which is to be bypassed. An FC-AL command can be sent to the device instructing it to bypass itself. Once bypassed, a device still receives commands that are sent around the loop and therefore can receive a command to un-bypass or enable the device.

In the embodiment shown in FIG. 1, a dual loop network 100 is shown by way of example, with two enclosures 106, 108 each with three disk drives 120 and two SES controllers 122, 124, one for each loop. Typical loop networks may have one or two host bus adapters and a set of six or so disk drive enclosures each of which may typically contain a set of ten to sixteen disk drives.

Figure 2:
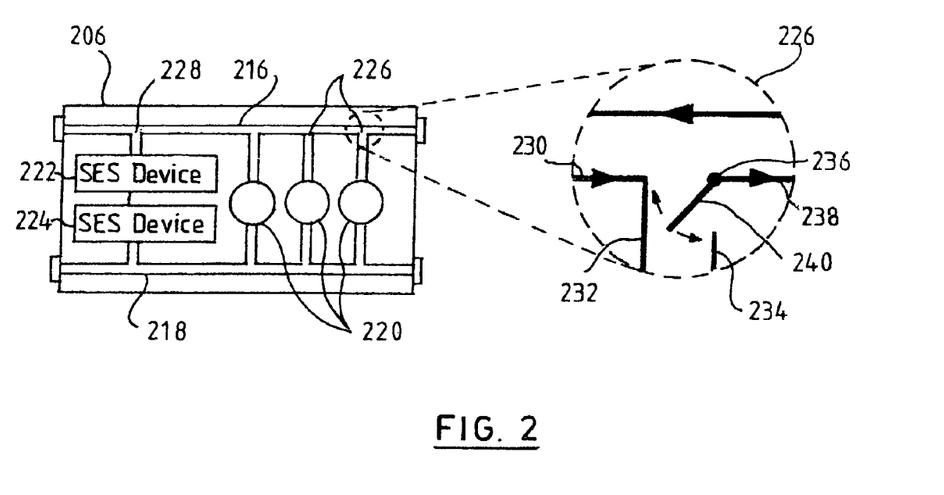
FIG. 2 is a diagram of a dual loop network with a detail showing a port bypass.

Referring to FIG. 2, the bypass circuits provided in an enclosure are shown in more detail. An enclosure 206 is shown of the same form as the enclosure 106 of FIG. 1. The enclosure 206 may be one of several connected together in a loop network. The enclosure 206 has two loops 216, 218 each of which pass through common disk drives 220. A bypass circuit 226 is provided for each disk drive 220 on each loop 216, 218. Bypass circuits 228 are also provided for the SES devices 222, 224 on each loop 216, 218.

The inset of FIG. 2 shows a schematic diagram of the effect of a bypass circuit 226 in the first loop 216 in more detail. The loop has a path 230 travelling from left to right which is routed off along a path 232 at right angles to travel to a disk drive 220. The loop 216 returns from the disk drive 220 along a return path 234 parallel to the path 232 to the disk drive 220. The return path 234 meets a junction 236 and turns a right angle to continue the left to right path 238 of the loop 216 towards the next disk drive 220. The junction 236 in effect has a switch 240 which can join the left to right paths 230, 238 to bypass the disk drive 220.

Figure 3:
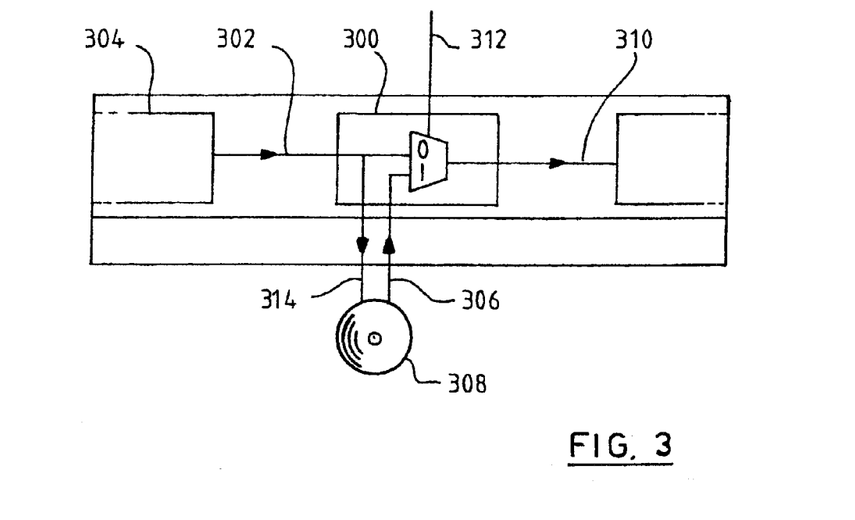
FIG. 3 is a diagram of a port bypass circuit.

Referring to FIG. 3, a bypass circuit 300 is shown. The bypass circuit 300 has an incoming fibre channel signal 302 from the previous disk drive bypass circuit 304 in the loop. The bypass circuit 300 also takes in a fibre channel signal 306 (referred to as the drive out signal) from the disk drive 308 for which the bypass circuit 300 operates. These two fibre channel signals 302, 306 are the input signals to the bypass circuit 300. The bypass circuit 300 selects which one of the incoming fibre channel signal 302 and the drive out signal 306 will be routed to the fibre channel outgoing signal 310 from the bypass circuit 300.

The selection of the input signals 302, 306 is controlled by a port bypass control signal 312. The disk drive 308 is bypassed by the incoming fibre channel signal 302 being routed to the outgoing signal 310 if the port bypass control signal is "0".

The port bypass control signal 312 will send a signal to bypass the disk drive 308 in the following situations:
1. The disk drive 308 is requesting a bypass. This happens when a disk drive has performed an internal initialisation, it detects a failure mode, or it receives a primitive sequence instructing a bypass. If the disk drive itself is not present, the enclosure will assert a signal for the disk drive to be bypassed.
2. An SES device wants to bypass the disk drive 308.

The port bypass control signal 312 will not bypass the disk drive 308 and will route the incoming drive out signal 306 to the outgoing signal 310 if the port bypass control signal is "1".

The port bypass control signal 312 will send a signal not to bypass the disk drive 308 in the following situations:
1. The disk drive 308 is present and is not requesting a bypass.
2. An SES device does not want to bypass the disk drive 308.

A logical AND is taken of the three inputs to form the port bypass signal 312 which means that if anything wants the disk drive 308 to be bypassed, it will be bypassed.

The incoming fibre channel signal 302 will always be transmitted 314 to the disk drive 308 but the disk drive output signal 306 is only selectively transmitted onwards along the loop. When a disk drive is bypassed it continues to receive the inbound signal but the outbound signal is disconnected. When the disk drive is bypassed by SES control, the disk drive does not know that it is bypassed and behaves as normal.

When a disk drive is un-bypassed, it rejoins the loop. The behaviour of the disk drive will depend on whether the disk drive has an address in the loop, if it does have an address it may rejoin the loop without disturbance. If the disk drive does not have an address, it will appear that the disk drive has logged out and the loop will not recognise the disk drive until the next network reconfiguration.

Figure 4A:
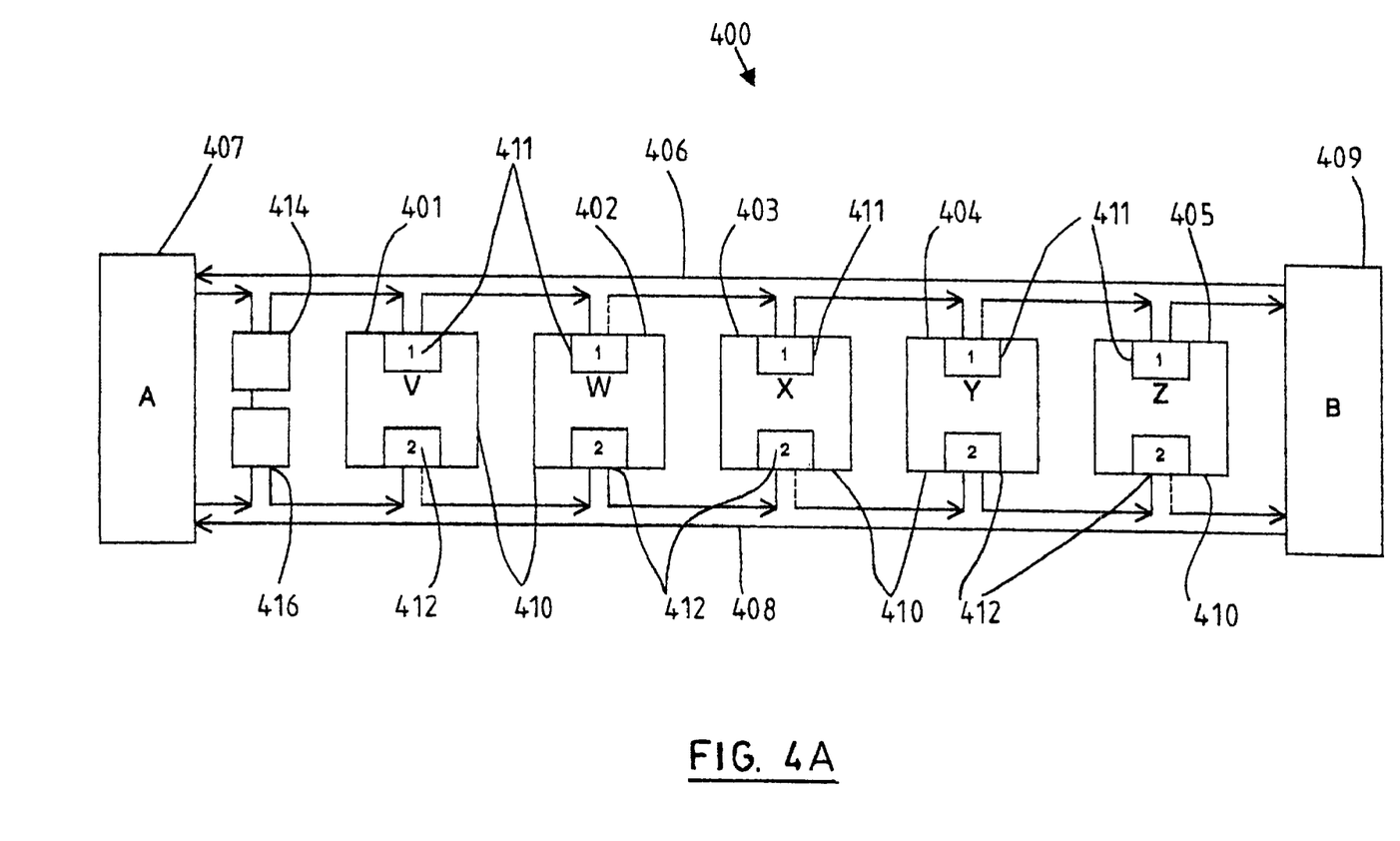
FIGS. 4A and 4B are diagrams of a dual loop network in accordance with the present invention.

Referring to FIG. 4A, a dual loop network 400 is shown in a simplified form with two initiators in the form of two host bus adapters A 407 and B 409 and five targets in the form of five devices 410 which are individually referred to as V 401, W 402, X 403, Y 404 and Z 405. The devices 410 may be disk drives or other loop components.

The loop network 400 has two loops 406, 408 and each of the devices 410 in the loop network 400 is dual-ported in that each device 410 has a port 411, 412 on each loop 406, 408. Each port 411 on the first loop 406 will be referred to as port 1 and each port 412 on the second loop 408 will be referred to as port 2. The loop network 400 also has SES device or devices 414, 416 which control the devices 410 that are in the same enclosure (not shown) as the SES devices 414, 416. Two SES devices 414, 416 are shown, one on each loop 406, 408 and connected across the backplane of an enclosure.

In the described embodiment, selected redundant ports 411, 412 are bypassed in order to minimise overhead associated with the number of ports in each loop 406, 408. This is referred to as "redundancy bypassing" as opposed to "fault bypassing" in which a bypass is instructed to remove a faulty port from a loop. In dual-ported devices 410 in which both ports 411, 412 are operational, one of the ports 411, 412 is possibly redundant and bypassing redundant ports reduces the round trip delay of a frame around a loop.

It is also preferable in a loop network 400 with more than one host bus adapter 407, 409 or other form of initiator, for both host bus adapters 407, 409 to use the same port of a dual-ported device 410. Dual-ported devices 410 do not necessarily cope with being accessed by the same or by different host bus adapters 407, 409 on both ports. This may even cause data transfer rates to be reduced because of the overhead in switching between ports. It is also possible that there are ordering issues to worry about. Only one host bus adapter 407, 409 can manage everything and know that all the other host bus adapters 407, 409 have the same view of the devices 410 including which port of dual-ported devices 410 to use.

Redundant ports are bypassed in a way that balances the port accesses across the two loops 406, 408. This can be done by applying a balancing algorithm in a host bus adapter 407, 409 to determine which ports should be bypassed. Alternatively, this could be selected according to slot positions of ports in an enclosure. Another possibility is to select the ports to by bypassed randomly across the loops. The same method of selection of ports is used in all host bus adapters or the selection is communicated between the host bus adapters to ensure that the same ports are bypassed by all the host bus adapters.

In FIG. 4A, devices V 401, X 403 and Z 405 have port 2 on the second loop 408 redundancy bypassed while port 1 on the first loop 406 is operable. Devices W 402 and Y 404 have port 1 on the first loop 406 bypassed while port 2 on the second loop 408 is operable. The redundancy bypassed ports are shown in FIG. 4A with dashed lines from the port 411, 412. This alternate arrangement of port redundancy bypasses evenly balances the port accesses across the first and second loops 406, 408 as approximately half the devices 410 are accessed via the first loop 406 and the other half via the second loop 408. This forces the two host bus adapters 407, 409 to both access a device 410 by the same port. The balance of use of ports between loops in a loop network results in performance improvement by making use of the full bandwidth of the loops.

The redundancy bypassing is carried out by sending an FC-AL command along a loop to specific devices 410 to instruct them to bypass themselves on that loop in accordance with the method described in relation to FIG. 3. The command is a Loop Port Bypass (LPB) command which specifies the port 411, 412 by its unique address or AL_PA.

During initialisation of a loop, a Loop Initialisation Procedure (LIP) allows each port 411, 412 to obtain an Arbitrated Loop Physical Address (AL_PA) that is unique within the loop 406, 408 for that port. This effectively uniquely identifies each port 411, 412 in a loop 406, 408 which enables a port 411, 412 to be specifically instructed to bypass itself.

The loop initialisation involves one port winning as Loop Initialisation Master (LIM). The LIM port manages the initialisation procedure. Disk drives can indicate that they do not wish to be the LIM. The Arbitrated Loop Physical Addresses (AL_PAs) are then allocated to each of the ports 411, 412 in the loop 406, 408. The LIM sends a frame around the loop 406, 408 with bits corresponding to AL_PAs. Each port 411, 412 finds the relevant bit for its AL_PA and changes the bit from "0" to "1" indicating that the AL_PA is not available for subsequent ports. The AL_PAs can be defined by previous addresses, assigned hardware addresses or software addresses. If there are multiple enclosures, each address indicates the enclosure and the device within the enclosure ensuring that each port 411, 412 in a loop 406, 408 has a unique address.

If a fault occurs in a device, the described embodiment bypasses the faulty device by issuing a command via an SES device 414, 416 in the enclosure in which the faulty device is located. This is not an FC-AL command and is therefore distinct from the redundancy bypassing commands.

Figure 4B:
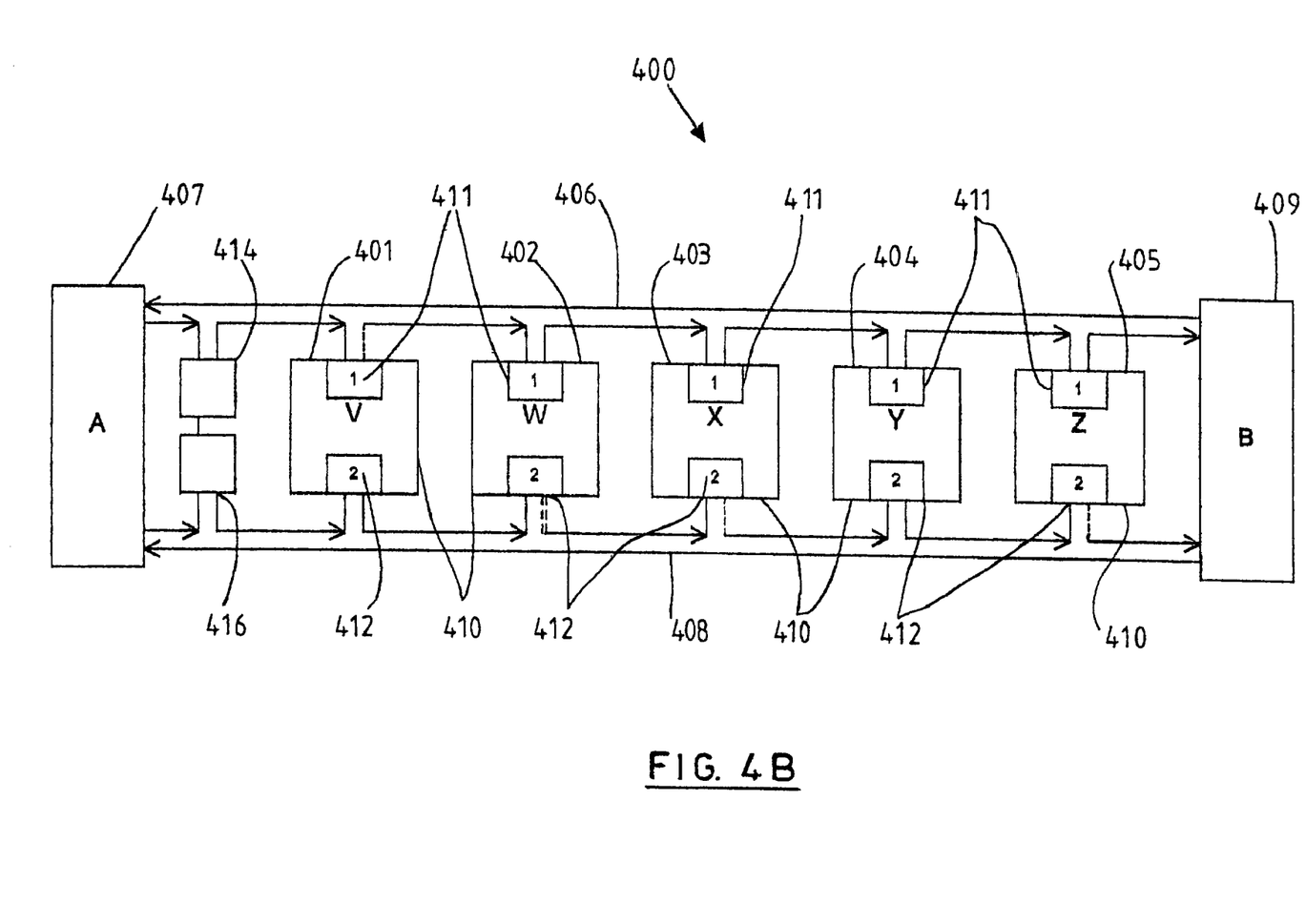

Referring to FIG. 4B, a fault may arise, for example, in device W 402 resulting in the only operative port for that device, namely port 2 on the second loop 408, being bypassed by the SES device 416. The fault bypass is shown in a double dashed line in FIG. 4B. Device W 402 is then inaccessible by either of the first and second loop 406, 408 as port 1 of device W 402 is redundancy bypassed.

If a fault bypass is carried out, the redundancy bypasses must be altered to un-bypass the redundant port for the faulty device. In other words, port 1 of device W 402 must be un-bypassed or enabled in order to allow access to device W 402.

In the described embodiment, in the event that a fault bypass is carried out, a command is sent in each loop 406, 408 to all the devices 410 to un-bypass or enable all the redundancy bypassed ports. The FC-AL architecture has a command for Loop Port Enable All (LPEall) which enables all bypassed ports. The LPEall command does not need to use the specific AL_PA of ports as it is instructing all the ports. Bypassed ports are still listening to commands sent round the loop and therefore can act on the LPEall command. This saves the delay of ascertaining which port redundancy bypass must be enabled and quickly gets the loop network up to full configuration. As the fault bypass has been carried out via a non-FC-AL command via the SES device 416, the fault bypass of port 2 of device W 402 will not be enabled by the LPEall command. The bypassing via an SES device is static and unaffected by initialisation procedures etc.

The use of the LPEall command removes the potential problem that if an initialisation of a loop has taken place while a device is bypassed from that loop, it will not have an AL_PA and therefore would not be able to respond to a direct command specifying an AL_PA.

When the LPEall command has enabled all the previously redundancy bypassed ports on a loop 406, 408, if any ports 411, 412 have lost knowledge of their $AL_{13}$ PA, a single loop initialisation will be carried out with all the ports un-bypassed except for the fault bypassed ports. This is true across a number of enclosures, as the LPEall command enables all ports in a loop 406, 408 including ports in multiple enclosures.

There will therefore only be a single loop initialisation procedure required for each loop thereby reducing the recovery time.

Referring to FIG. 4B, redundancy bypassing can again be applied to the loop network 400 but now taking into consideration the fault bypassed port 2 of device W 402. This will affect the balance of the port accesses across the two loops 406, 408 and different ports 411, 412 are likely to be redundancy bypassed to the previous arrangement. FIG. 4B shows that port 1 of device V 401 is now redundancy bypassed instead of port 2 in order to balance as closely as possible (given that there are an odd number of devices) all the bypassed (redundancy and fault) ports on both loops. In this way, dynamic bypassing for performance automatically copes with ports being bypassed for fault related issues.

Figure 5:
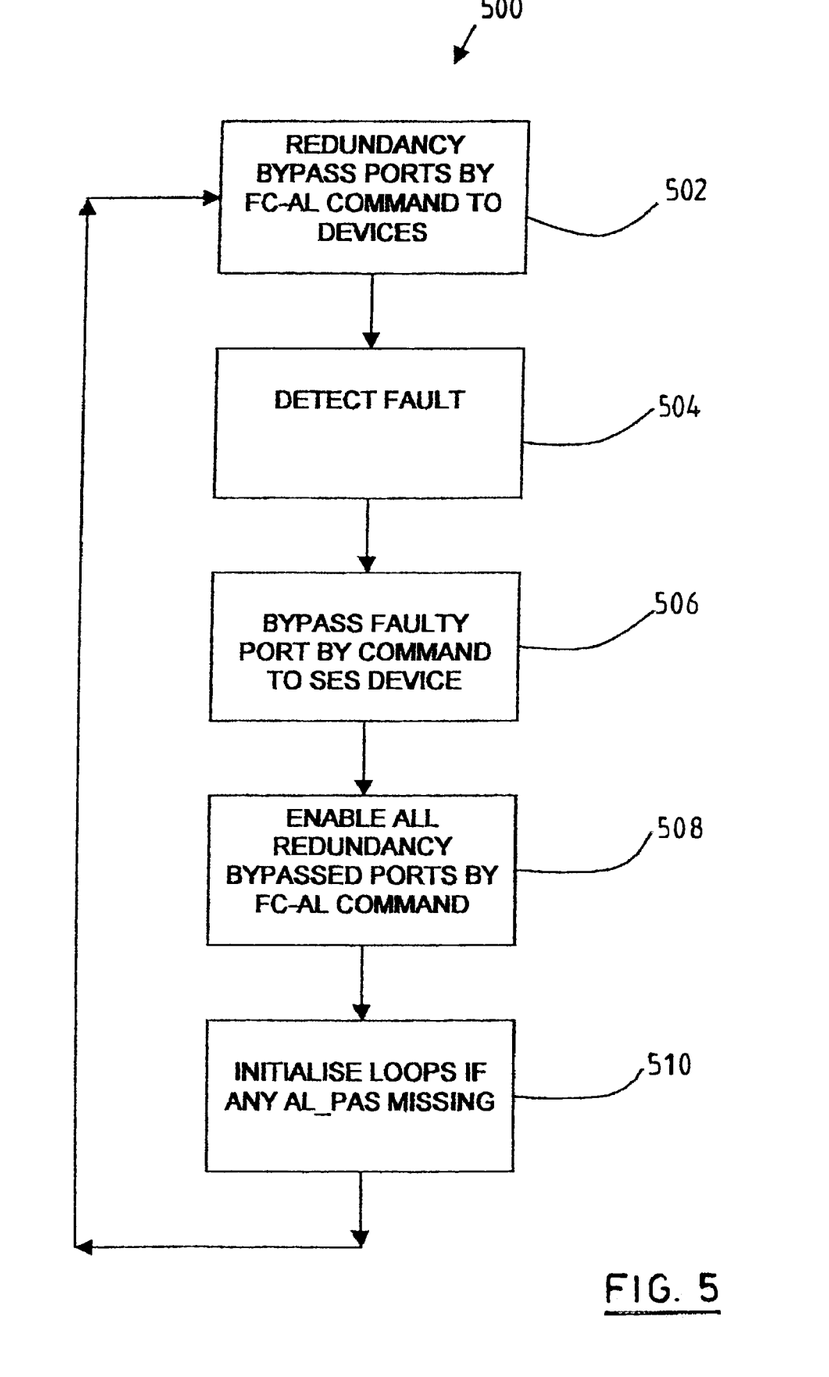
FIG. 5 is a flow diagram of a method in accordance with the present invention.

FIG. 5 is a flow diagram of the bypassing procedure 500 in a loop network. A loop network instructs ports to redundancy bypass 502 in accordance with a balancing algorithm or other means. A fault is detected 504 and the faulty device is bypassed 506 via an SES device command. An LPEall command is sent 508 on each loop un-bypassing all redundancy bypassed ports but not un-bypassing the fault bypassed port. Each loop carries out an initialisation procedure 510 if one or more un-bypassed ports has lost its AL_PA. The loop network then instructs ports to redundancy bypass 502 in accordance with a new balancing algorithm or other means taking into account the fault bypassed port.

The method described herein is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

Improvements and modifications can be made to the foregoing without departing from the scope of the present invention.

What is claimed is:

1. A method for improving performance of a loop network, the loop network having a plurality of loops and a plurality of multi-ported devices, each port thereof connected to a different loop, the method comprising:

selectively bypassing redundant ports on the loops by a first command means;

bypassing a port of a device by a second command means in response to a fault;

enabling all selectively bypassed redundant ports with a single Loop Port Enable All (LPEall) Fibre Channel Arbitrated Loop command to all ports using the first command means, without enabling the port bypassed in response to the fault, wherein the loop network is a Fibre Channel Arbitrated Loop (FC-AL) and the first command means provides a Fibre Channel Arbitrated Loop command; and selectively bypassing redundant ports on the loops with port accesses balanced across the loops by alternating bypassing first loop ports on every other device and second loop ports on remaining devices.

2. The method of claim 1, wherein the second command means is an enclosure services device.

3. A loop network for conducting communications among a plurality of dual-ported devices connected to a plurality of loops, with each port connected to a different loop, the loop network comprising:

means for selectively bypassing redundant ports on the plurality of loops by a first command means;

means for bypassing the port of a device by a second command means in response to a fault;

means for enabling all the bypassed redundant ports with a single Loop Port Enable All (LPEall) Fibre Channel Arbitrated Loop command to all ports using the first command means without enabling the port bypassed in response to the fault, wherein the loop network has at least one enclosure with an enclosure services device, the loop network is a Fibre Channel Arbitrated Loop (FC-AL), and the first command means is configured to provide a Fibre Channel Arbitrated Loop command; and selectively bypassing redundant ports on the loops with port accesses balanced across the loops by alternating bypassing first loop ports on every other device and second loop ports on remaining devices.

4. The loop network of claim 3, wherein the second command means is the enclosure services device.

5. The loop network of claim 3, wherein the loop network includes more than one host bus adapter and the means for selectively bypassing redundant ports provides a consistent view of the remaining operational ports to all the host bus adapters.

6. An enclosure for inclusion within a loop network comprising a plurality of loops, the enclosure comprising:

a plurality of devices comprising a plurality of ports, each port configured to connect to a different loop of the plurality of loops;

means for selectively bypassing each port of the plurality of devices;

means for bypassing a port of a device of the plurality of devices in response to a fault;

means for enabling the selectively bypassed ports with a single Loop Port Enable All (LPEall) Fibre Channel Arbitrated Loop command to all ports without enabling the port bypassed in response to the fault, wherein the plurality of ports are configured to connect to Fibre Channel Arbitrated Loops (FC-AL) and the means for selectively bypassing each port is configured to respond to a Fibre Channel Arbitrated Loop command; and means for selectively bypassing redundant ports on the loops with port accesses balanced across the loops by alternating bypassing first loop ports on every other device and second loop ports on remaining devices.

7. The enclosure of claim 6, wherein the means for bypassing a port in response to a fault comprises an enclosure services device.

8. An apparatus for bypassing a port within an enclosure the apparatus comprising:

a bypass circuit configured to receive a port bypass control signal and bypass a port in response to assertion of the port bypass control signal;

a bypass control module configured to provide the bypass control signal;

the bypass control module further configured to assert the bypass control signal in response to a Fibre Channel Arbitrated Loop command;

the bypass control module further configured to assert the bypass control signal in response to faults communicated by a storage enclosure services device;

the bypass control module further configured to de-assert the bypass control signal in response to a single Loop Port Enable All (LPEall) Fibre Channel Arbitrated Loop command if the bypass control signal is not asserted in response to faults communicated by the storage enclosure services device; and selectively bypassing redundant ports with port accesses balanced across two loops by alternating bypassing first loop ports on every other device and second loop ports on remaining devices.

9. A system for improving communications among a plurality of multi-ported devices connected to a plurality of loops, with each port connected to a different loop, the system comprising:

means for bypassing selected ports in response to a Fibre Channel Arbitrated Loop command;

means for bypassing a port in response to a fault;

means for enabling the selected ports in response to a single Loop Port Enable All (LPEall) Fibre Channel Arbitrated Loop command without enabling the port bypassed in response to the fault; and means for selectively bypassing redundant ports on the loops with port accesses balanced across the loops by alternating bypassing first loop ports on every other device and second loop ports on remaining devices.

10. A computer readable storage medium with a computer program product which comprising computer readable program code means for improving performance in a loop network, the loop network having a first loop, a second loop and a plurality of dual-ported devices each with one port on each loop, the program code means performing the steps of:

selectively bypassing redundant ports on the plurality of loops by a first command means;

bypassing the port of a device by a second command means in response to a fault; and enabling all the bypassed redundant ports with a single Loop Port Enable All (LPEall) Fibre Channel Arbitrated Loop command to all ports using the first command means without enabling the port bypassed in response to a fault, wherein the first command means does not enable the port bypassed in response to the fault and the second command means is the enclosure services device; and selectively bypassing redundant ports on the loops with port accesses balanced across the loops by alternating bypassing first loop ports on every other device and second loop ports on remaining devices.

* * * * *